(12) United States Patent
Fujibayashi

(10) Patent No.: US 10,330,775 B2
(45) Date of Patent: Jun. 25, 2019

(54) TRANSMITTER, TRANSMISSION METHOD, PHASE ADJUSTMENT DEVICE, AND PHASE ADJUSTMENT METHOD

(71) Applicant: ASAHI KASEI MICRODEVICES CORPORATION, Tokyo (JP)

(72) Inventor: Takeji Fujibayashi, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 196 days.

(21) Appl. No.: 15/541,803

(22) PCT Filed: Apr. 12, 2016

(86) PCT No.: PCT/JP2016/061815
§ 371 (c)(1),
(2) Date: Jul. 6, 2017

(87) PCT Pub. No.: WO2016/167253
PCT Pub. Date: Oct. 20, 2016

(65) Prior Publication Data
US 2018/0003801 A1    Jan. 4, 2018

(30) Foreign Application Priority Data

Apr. 13, 2015   (JP) .................................. 2015-081697

(51) Int. Cl.
*G01S 7/40* (2006.01)
*H01Q 3/36* (2006.01)
(Continued)

(52) U.S. Cl.
CPC ............. *G01S 7/4008* (2013.01); *H01Q 3/36* (2013.01); *H04B 7/10* (2013.01); *G01S 13/931* (2013.01); *G01S 2007/4034* (2013.01)

(58) Field of Classification Search
CPC ................. G01S 7/4008; G01S 13/931; G01S 2007/4034; G01S 7/40; H01Q 3/36; H04B 7/10
(Continued)

(56) References Cited

U.S. PATENT DOCUMENTS

| | | | | |
|---|---|---|---|---|
| 4,829,257 A | * | 5/1989 | Cooper | H03H 7/20 327/113 |
| 6,400,318 B1 | * | 6/2002 | Kasami | H01Q 3/2605 342/372 |

(Continued)

FOREIGN PATENT DOCUMENTS

| | | |
|---|---|---|
| JP | H11-225014 A | 8/1999 |
| JP | 2003-307561 A | 10/2003 |

(Continued)

OTHER PUBLICATIONS

Shin et al., "60 GHz Active Phase Shifter using an Optimized Quadrature All-Pass Network in 45nm CMOS", Microwave Symposium Digest (MTT), 2012 IEEE MTT-S International.
(Continued)

*Primary Examiner* — Timothy X Pham
(74) *Attorney, Agent, or Firm* — Morgan Lewis & Bockius LLP

(57) ABSTRACT

The transmitter includes a phase shifter that shifts a phase of an input signal and outputs a shifted signal; a first control circuit changes a phase shift amount of the phase shifter; a phase difference signal output circuit outputs a phase difference signal between the shifted signal and the reference signal; an extreme value output circuit outputs a value of the phase difference signal when the phase difference signal becomes the extreme value; a target value output circuit outputs a target value based on an output from the extreme value output circuit; and a second control circuit controls the phase shift amount of the phase shifter such that a value of
(Continued)

the phase difference signal coincides with the target value. The phase shifter outputs, as a transmission wave, the input signal the phase of which is shifted by the phase shift amount controlled by the second control circuit.

6 Claims, 5 Drawing Sheets

(51) Int. Cl.
    *H04B 7/10*     (2017.01)
    *G01S 13/93*     (2006.01)

(58) Field of Classification Search
    USPC .......................................................... 342/174
    See application file for complete search history.

(56) References Cited

U.S. PATENT DOCUMENTS

| | | | | |
|---|---|---|---|---|
| 6,426,721 | B1* | 7/2002 | Obara | H01Q 3/2676 |
| | | | | 342/372 |
| 7,999,624 | B2* | 8/2011 | Wan | H03L 7/23 |
| | | | | 331/1 A |
| 2005/0239419 | A1 | 10/2005 | Fudaba et al. | |
| 2010/0027586 | A1* | 2/2010 | Ogasawara | H03L 7/0998 |
| | | | | 375/130 |
| 2010/0315170 | A1* | 12/2010 | Locascio | H03B 5/30 |
| | | | | 331/15 |
| 2012/0235717 | A1* | 9/2012 | Hirai | H03L 7/0891 |
| | | | | 327/156 |
| 2014/0139373 | A1* | 5/2014 | Tseng | H01Q 3/36 |
| | | | | 342/374 |
| 2015/0139352 | A1 | 5/2015 | Matsuo et al. | |

FOREIGN PATENT DOCUMENTS

| | | |
|---|---|---|
| JP | 2006-304205 A | 11/2006 |
| JP | 2014-179785 A | 9/2014 |
| WO | 2004/109952 A1 | 12/2004 |

OTHER PUBLICATIONS

International Search Report dated Jul. 5, 2016 for corresponding International Patent Application No. PCT/JP2016/061815.
International Preliminary Report on Patentability dated Oct. 26, 2017, for the corresponding International Application No. PCT/JP2016/061815.

* cited by examiner

TRANSMITTER, TRANSMISSION METHOD, PHASE ADJUSTMENT DEVICE, AND PHASE ADJUSTMENT METHOD

TECHNICAL FIELD

The present invention relates to a transmitter, a transmission method, a phase adjustment device, and a phase adjustment method.

BACKGROUND ART

In wireless communication, a technology of controlling the emission direction of a transmission wave emitted form an antenna has been developed. Such a technology is referred to as beam forming. In the beam forming, transmission waves the phases of which are different from one another are emitted from the respective ones of a plurality of antennas. A plurality of transmission waves emitted from the plurality of antennas strengthen one another by having the same phase in a specific direction and weaken one another by having the reverse phases to cancel one another in another direction. Using the above phenomenon, the beam forming is capable of performing control of emitting transmission waves concentrated on any desired direction or emitting no transmission wave in any desired direction.

In the description of the present invention, the beam forming will be described mainly from the standpoint of transmitting carrier waves. However, from the standpoint of receiving transmission waves, the beam forming is also capable of performing control of receiving a transmission wave transmitted from any desired direction in a strengthening manner and not receiving any transmission wave transmitted from another direction.

In the above-described beam forming, it is required to appropriately select a phase of a transmission wave transmitted from each antenna and to control the state thereof. In order to control a phase, using a transmitter including a phase shifter is conceivable.

FIG. 6 is a functional block diagram exemplifying a known transmitter including the phase shifter 101. Transmitters 100a and 100b illustrated in FIG. 6 make phase shifters 101 shift the phases of respective transmission waves generated by a signal source 109, and, via power amplifiers 107, supply antennas 103 with the phase-shifted transmission waves. The antennas 103 transmit the transmission waves amplified by the power amplifiers 107. Phase shift amounts in the phase shifters 101 are determined in accordance with phase control signals output from not-illustrated control circuits.

Switching the emission directions of transmission waves dynamically using the transmitters 100a and 100b described above requires the phases of the transmission waves supplied to the respective antennas to be selected with high accuracy. A phase shifter that dynamically switches the phase of a transmission wave is described in, for example, NPL 1.

In PTL 1, detecting a phase error amount between a transmission branch and another transmission branch is disclosed. According to PTL 1, the detected phase error amount takes a maximum value when a phase difference between the transmission branch and the another transmission branch indicates the same phase and a minimum value when the phase difference indicates reverse phases. A transmission device disclosed in PTL 1, using such a phenomenon, controls the phase difference between a transmission branch and another transmission branch to the same phase or reverse phases.

CITATION LIST

Non Patent Literature

NPL 1: 60 GHz Active Phase Shifter using an Optimized Quadrature All-Pass Network in 45 nm CMOS, Woorim Shin, Microwave Symposium Digest (MTT), 2012 IEEE MTT-S International.

Patent Literature

PTL 1: JP 2014-179785 A

SUMMARY OF INVENTION

Technical Problem

However, for example, in an in-vehicle millimeter wave radar, a high frequency signal of several tens of GHz is used as a transmission carrier. In the case of a transmission system using such a high frequency, known systems have a difficulty in controlling phases with high accuracy. It has been known that, in a conventional phase shifter, the phases of transmission waves transmitted from a plurality of antennas have an error of approximately 10 degrees there among. Although measuring such an error in advance and correcting the error are conceivable, an error between phases fluctuates depending on temperature and the like. Correcting an error between phases in consideration of temperature and the like is considered to complicate the processing of correction substantially.

In an in-vehicle radar, it is required to correct the emission directions of a transmission wave depending on changes in the longitudinal inclination angle of the vehicle. That is, the angle of the chassis of a vehicle changes in accordance with the weight of the rear loading space and the like. In beam forming, the need arises to correct a difference between the emission directions of transmission waves before and after change in the angle of the chassis and to keep the emission direction level. In such a case, it is required to control the emission direction of a transmission wave with an accuracy of several degrees. On this occasion, although depending on the arrangement of antennas, it also is required to adjust the phase of a transmission wave with an accuracy of several degrees.

Achieving phase adjustment with such a high accuracy has been difficult for a transmitter including the conventional phase shifter, in particular, in the field where a transmission wave has a high frequency.

The present invention is made in consideration of the above problem, and an object of the present invention is to provide a transmitter, a transmission method, a phase adjustment device, and a phase adjustment method that are capable of controlling the phase of a transmission wave to any desired value with high accuracy in a transmitter in which a high frequency signal in the order of several tens of GHz is used as a transmission wave.

Solution to Problem

In order to achieve the object mentioned above, according to an aspect of the present invention, there is provided a transmitter including: a phase shifter configured to shift a phase of an input signal and to output a shifted signal the phase of which is shifted; a first control circuit configured to change, within a predetermined range, a phase shift amount by which the phase shifter shifts the phase of the input signal; a phase difference signal output circuit configured to receive the shifted signal output by the phase shifter and a reference signal and to output a phase difference signal based on a phase difference between the shifted signal and the reference signal; an extreme value output circuit configured to, when the phase difference signal takes an extreme value while the first control circuit is changing the phase shift amount, output a value of the phase difference signal at the phase shift amount at which the phase difference signal becomes the extreme value; a target value output circuit configured to, based on an output from the extreme value output circuit, output a target value; and a second control circuit configured to control the phase shift amount of the phase shifter in such a way that a value of the phase difference signal output by the phase difference signal output circuit coincides with the target value output from the target value output circuit, wherein the phase shifter shifts the phase of the input signal in accordance with the phase shift amount controlled by the second control circuit and outputs the input signal the phase of which is shifted as a transmission wave.

In the above-mentioned aspect of the present invention, the second control circuit of the transmitter may receive the phase difference signal from the phase difference signal output circuit and the target value from the target value output circuit, and may control the phase shift amount of the phase shifter so that the phase difference signal coincides with the target value.

According to another aspect of the present invention, there is provided a transmission method including: a first phase shift step of shifting a phase of an input signal within a predetermined range of phases; a phase difference signal generation step of generating a phase difference signal based on a phase difference between the input signal the phase of which is shifted in the first phase shift step and a reference signal; an extreme value output step of, when the phase difference signal takes an extreme value while the phase of the input signal is being shifted in the first phase shift step, outputting a value of the phase difference signal at a phase shift amount at which the phase difference signal becomes the extreme value; a target value output step of outputting a target value based on the value of the phase difference signal output in the extreme value output step; a second phase shift step of shifting the phase of the input signal in such a way that a value of the phase difference signal generated in the phase difference signal generation step coincides with the target value; and outputting, as a transmission wave, the input signal the phase of which is shifted in the second phase shift step.

According to still another aspect of the present invention, there is provided a phase adjustment device including: a phase shifter configured to shift a phase of an input signal and to output a shifted signal the phase of which is shifted; a first control circuit configured to change, within a predetermined range, a phase shift amount by which the phase shifter shifts the phase of the input signal; a phase difference signal output circuit configured to receive the shifted signal output by the phase shifter and a reference signal and to output a phase difference signal based on a phase difference between the shifted signal and the reference signal; an extreme value output circuit configured to, when the phase difference signal takes an extreme value while the first control circuit is changing the phase shift amount, output the extreme value of the phase difference signal; a target value output circuit configured to output a target value that is set based on the extreme value output by the extreme value output circuit; and a second control circuit configured to control the phase shift amount of the phase shifter in such a way that a value of the phase difference signal output by the phase difference signal output circuit coincides with the target value output from the target value output circuit.

In the above-mentioned aspect of the present invention, the second control circuit of the phase adjustment device may receive the phase difference signal from the phase difference signal output circuit and the target value from the target value output circuit, and control the phase shift amount of the phase shifter in such a way that the phase difference signal coincides with the target value.

According to yet another aspect of the present invention, there is provided a phase adjustment method including: a first phase shift step of shifting a phase of an input signal within a predetermined range of phases; a phase difference signal generation step of generating a phase difference signal based on a phase difference between the input signal the phase of which is shifted in the first phase shift step and a reference signal; an extreme value output step of, when the phase difference signal takes an extreme value while the phase of the input signal is being shifted in the first phase shift step, outputting a value of the phase difference signal at a phase shift amount at which the phase difference signal becomes the extreme value; a target value output step of outputting a target value based on the value of the phase difference signal output in the extreme value output step; and a second phase shift step of shifting the phase of the input signal in such a way that a value of the phase difference signal generated in the phase difference signal generation step coincides with the target value.

Advantageous Effects of Invention

According to the above-mentioned aspects of the present invention, it is possible to provide a transmitter, a transmission method, a phase adjustment device, and a phase adjustment method that are capable of controlling the phase of a transmission wave to any desired value with high accuracy in a transmitter in which a high frequency signal in the order of several tens of GHz is used as a transmission wave.

DESCRIPTION OF EMBODIMENTS

A first embodiment and a second embodiment of the present invention will now be described.

First Embodiment

<Transmitter>

Figure 1:
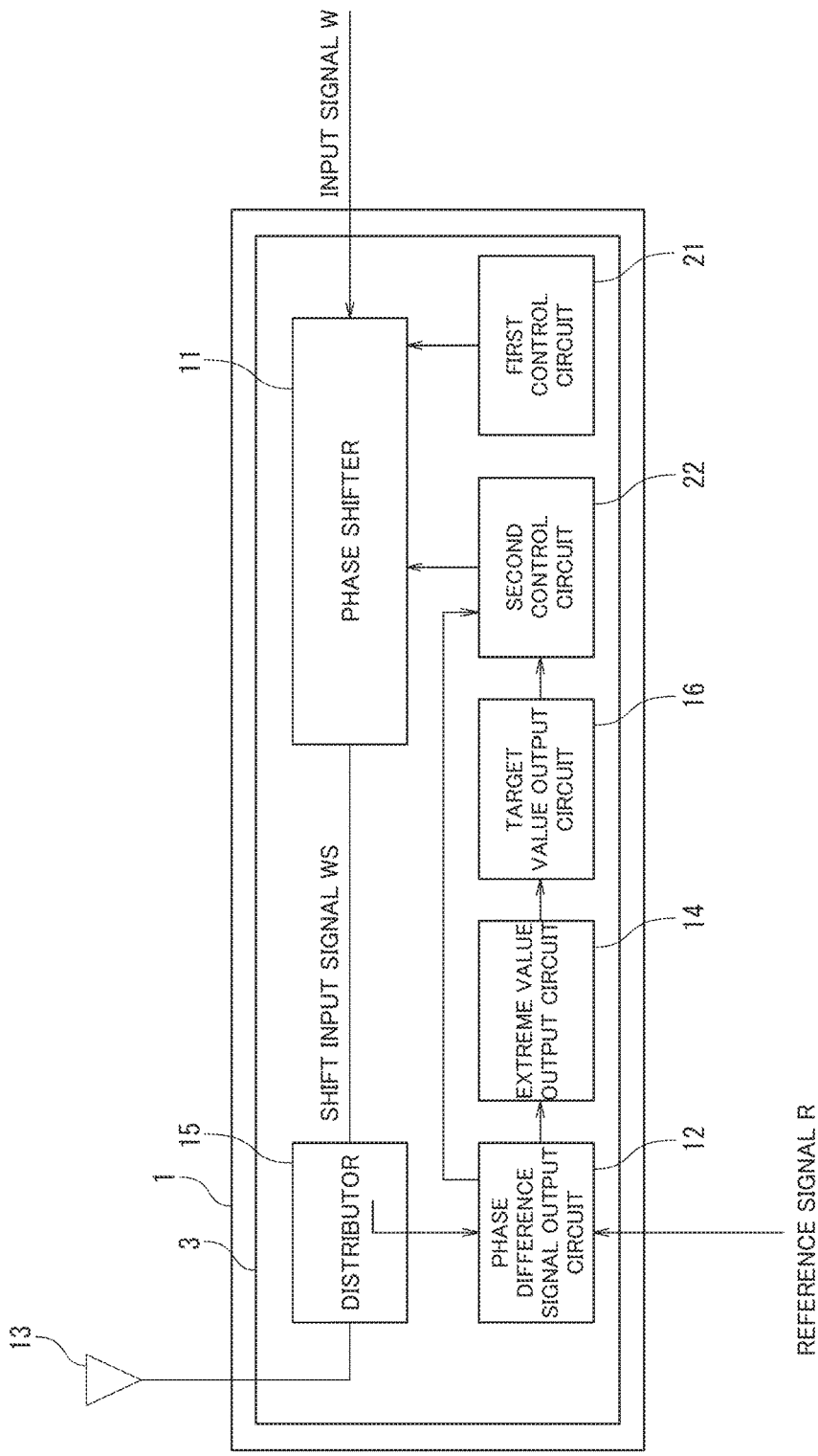
FIG. 1 is a block diagram for a description of a phase adjustment device and a transmitter of a first embodiment of the present invention.

FIG. 1 is a block diagram for a description of a transmitter including a phase adjustment device of the first embodiment. A transmitter 1 illustrated in FIG. 1 includes a phase adjustment device 3 and an antenna 13.

Although, in the first embodiment, description will be made using a transmitter including a phase adjustment device as an example, the phase adjustment device of the first embodiment is also applicable to a receiver.

<Phase Adjustment Device>

The phase adjustment device 3 includes a phase shifter 11 that shifts the phase of an input signal W that is input, a first control circuit 21 that successively changes the phase shift amount of the phase shifter 11, a distributor 15 that distributes a shift input signal WS the phase of which is shifted, a phase difference signal output circuit 12 to which the shift input signal WS, which is distributed by the distributor 15, and a reference signal R are input and that outputs a phase difference signal based on a phase difference between the shift input signal WS and the reference signal R, an extreme value output circuit 14 that acquires and outputs an extreme value of the phase difference signal, the extreme value being obtained when the first control circuit 21 successively changes the phase shift amount of the phase shifter 11, a target value output circuit 16 that sets and outputs a target value based on the extreme value, which the extreme value output circuit 14 outputs, and a second control circuit 22 to which the phase difference signal output by the phase difference signal output circuit 12 and the target value output by the target value output circuit 6, are input and that controls the phase shift amount of the phase shifter 11 in such a way that the extreme value coincides with the target value.

The shift input signal WS the phase of which is shifted is supplied to the antenna 13 via the distributor 15 and is output to the outside as a transmission wave.

In the first embodiment, the input signal W is generated by a not-illustrated signal source and the reference signal R is generated by a not-illustrated signal generation unit. The signal source and the signal generation unit are assumed to be disposed in an apparatus in which the transmitter 1 is disposed. Such apparatuses include, for example, a collision prevention system mounted on a vehicle and the like.

Next, the respective components, illustrated in FIG. 1, will be described.

(Phase Shifter)

The phase shifter 11 shifts the phase of the input signal W and outputs the shift input signal WS.

(First Control Circuit)

The first control circuit 21 successively changes the phase shift amount of the phase shifter 11. As a specific processing of changing the shift amount, for example, the first control circuit 21 sweeping the phase shift amount of the phase shifter 11 in a range of 180 degrees or more is conceivable. Alternatively, the first control circuit 21 may, for example, change the phase shift amount of the phase shifter 11 repeatedly at a fixed interval in a range from 60 degrees to 240 degrees.

(Distributor)

To the distributor 15, the shift input signal WS is input. The distributor 15 distributes the input shift input signal WS to the antenna 13 and the phase difference signal output circuit 12.

(Phase Difference Signal Output Circuit)

To the phase difference signal output circuit 12, the shift input signal WS and the reference signal R are input. The phase difference signal output circuit 12 outputs a phase difference signal based on a phase difference between the shift input signal WS and the reference signal R. The phase difference signal output circuit of the first embodiment includes a down conversion mixer and a low pass filter disposed at a stage succeeding the down conversion mixer, both of which will be illustrated later. The phase difference signal output circuit 12, by performing frequency conversion using the down conversion mixer, generates and outputs the phase difference signal corresponding to the phase difference between the shift input signal WS and the reference signal R.

In the above, the signal, which the down conversion mixer outputs, corresponding to the phase difference between the shift input signal WS and the reference signal R is expressed by the formulae (1), (2), and (3), described below.

The shift input signal WS and the reference signal R are assumed to be expressed by the formulae (1) and (2), respectively, as described below. In the formulae (1) and (2), f, t, and θ respectively denote a frequency, time, and a phase difference. The frequency of the shift input signal WS is identical to the frequency of the reference signal R.

[Math. 1]
$$D \sin(2\pi ft + \theta) \ldots \quad \text{formula (1)}$$

[Math. 2]
$$E \sin(2\pi ft) \ldots \quad \text{formula (2)}$$

Under the above-described conditions, an output V from the down conversion mixer is expressed by the formula (3) below. The output V expressed by the formula (3) is a DC signal corresponding to the phase difference θ. In addition, in the formula (3), K is a conversion gain that the down conversion mixer has, D is the power of the input signal W, and E is the power of the reference signal R. In the formula (3), a high frequency component generated as a by-product is omitted assuming that the high frequency component is removed by the low pass filter.

[Math. 3]
$$V = D\sin(2\pi ft + \theta) \times E\sin(2\pi ft) = -K\frac{DE}{2}\cos\theta \quad \text{formula (3)}$$

The configuration for generating a phase difference signal in the first embodiment is not limited to the configuration in which the operation expressed by the formula (3) is performed using the above-described down conversion mixer and low pass filter. The configuration for removing a high frequency component generated as a by-product is also not limited to the low pass filter and may include, for example, an averaging processing circuit.

(Extreme Value Output Circuit)

To the extreme value output circuit 14, outputs from the phase difference signal output circuit 12 when the first control circuit 21 successively changes the phase shift amount of the phase shifter 11 are input. That is, to the extreme value output circuit 14, values of the phase difference signal when the phase difference θ in the formula (3)

is successively changed are input. The values of the phase difference signal are stored in not-illustrated memory in the extreme value output circuit 14.

Figure 2:
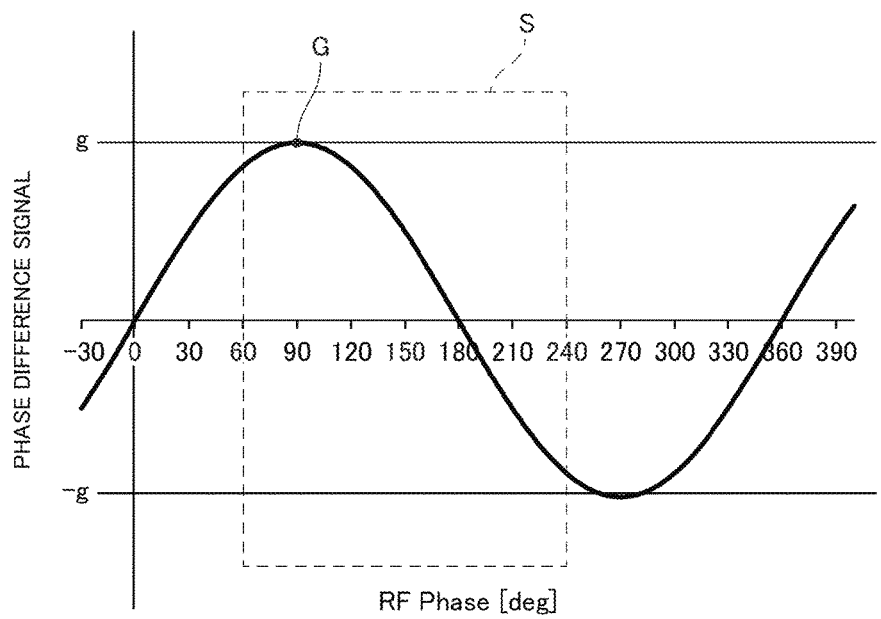
FIG. 2 is a diagram illustrative of a relationship between a phase shift amount changed by a first control circuit and a phase difference signal output from a phase difference signal output circuit illustrated in FIG. 1.

FIG. 2 is a diagram illustrative of a relationship between the phase shift amount changed by the first control circuit 21 and the phase difference signal output from the phase difference signal output circuit 12. The ordinate of a graph illustrated in FIG. 2 indicates the phase difference signal output from the phase difference signal output circuit 12 and the abscissa indicates the phase shift amount changed by the first control circuit 21.

When the first control circuit 21 sweeps the phase shift amount of the phase shifter 11 in a range from 60 degrees to 240 degrees, values of the phase difference signal corresponding to phase shift amounts in the range from 60 degrees to 240 degrees indicated by a dashed line rectangular portion S illustrated in FIG. 2 are output from the phase difference signal output circuit 12.

A curve illustrated in FIG. 2 is expressed by the formula (3). The respective coefficients in the formula (3) are unknown. Using the curve illustrated in FIG. 2, a point G at which the curve takes a local maximum value or a local minimum value at a certain phase is obtained. The absolute value g of the local maximum value or the local minimum value at the point G is equivalent to $-K \times D \times E/2$ in the formula (3). In the description of the present invention, a local maximum value and a local minimum value are collectively referred to as an "extreme value".

The extreme value output circuit 14 obtains and outputs the absolute value g of the local maximum value or the local minimum value from values of the phase difference signal stored in the not-illustrated memory.

(Target Value Output Circuit)

In advance of describing the target value output circuit 16, first, a method of adjusting the phase of the shift input signal WS in such a way that the phase difference thereof from the reference signal R coincides with θ will be described. The phase adjustment maybe performed by a manufacturer before shipment of the transmitter 1. The phase adjustment may also be performed by users optionally depending on the use of and the purpose of use of the transmitter after shipment.

When the phase difference between the shift input signal WS and the reference signal R is θ, the phase difference signal, which the phase difference signal output circuit 12 outputs, is expressed by the formula (3). The absolute value of $-K \times D \times E/2$, which is obtained from the formula (3), coincides with the absolute value g of the local maximum value or the local minimum value at the point G. The absolute value g can be calculated by the extreme value output circuit 14 on the basis of the curve illustrated in FIG. 2.

For example, a case in which the phase difference between the shift input signal WS and the reference signal R is adjusted to θ1 is assumed. If the phase difference between the shift input signal WS and the reference signal R is θ1, the value of the phase difference signal, which is output from the phase difference signal output circuit 12, becomes $g \times \cos\theta 1$. In the first embodiment, when the phase difference between the shift input signal WS and the reference signal R is desired to be adjusted to θ1, the phase shift amount of the phase shifter 11 is, using the above relation, adjusted in such a way that the value of the phase difference signal, which is output from the phase difference signal output circuit 12, coincides with $g \times \cos\theta 1$.

The target value output circuit 16, on the basis of the absolute value g, which the extreme value output circuit 14 outputs, and a target phase difference θ1 between the shift input signal WS and the reference signal R, generates a target value $g \times \cos\theta 1$ of the phase difference signal and outputs the generated target value to the second control circuit 22. The target phase difference θ1 between the shift input signal WS and the reference signal R may be input from the outside or maybe a value that the target value output circuit 16 retains.

(Second Control Circuit)

To the second control circuit 22, the phase difference signal, which the phase difference signal output circuit 12 outputs, and the target value, which the target value output circuit 16 has output, are input. The second control circuit 22 controls the phase shift amount of the phase shifter 11 in such a way that the phase difference signal coincides with the target value. In the embodiment, the expression "in such a way that the phase difference signal coincides with the target value" specifically means controlling a difference between the phase difference signal and the target value to a predetermined value or smaller. In the first embodiment, it is also assumed that both the phase difference signal and the target value, which are input to the second control circuit 22, are A/D converted digital signals.

(Phase Shifter)

The phase shifter 11 shifts the phase of the input signal W in accordance with the phase shift amount, which is controlled by the second control circuit 22. The shift of the phase causes the input signal W to become the shift input signal WS the phase of which is advanced by the target phase difference θ1 with respect to the reference signal R. The shift input signal WS is supplied to the antenna 13.

(Antenna)

The antenna 13 outputs, as a transmission wave, the shift input signal WS the phase of which is advanced by the target phase difference θ1 with respect to the reference signal R.

The first embodiment described above provides an advantageous effect described below.

In a known transmitter, a conversion gain K of a down conversion mixer, the power D of an input signal W, and the power E of a reference signal R fluctuate in accordance with ambient temperature, and the absolute value g of an extreme value of a phase difference signal also changes in accordance with the ambient temperature. In the first embodiment, since the absolute value g corresponding to the ambient temperature can be acquired, it may be possible to control the phase of a transmission wave to any desired value with high accuracy regardless of the ambient temperature.

The transmitter of the first embodiment is not limited to the configuration described above. That is, in the above description, a case in which the transmitter includes one antenna and a phase difference between a transmission wave output from the one antenna and a reference signal is adjusted to a desired phase difference was described. However, the first embodiment may be applied to a case in which, in a transmitter including a plurality of antennas, a phase difference(s) between transmission waves output from the plurality of antennas is/are adjusted to a desired phase difference.

For example, a case is considered in which, in a transmitter including an antenna A that outputs a transmission wave w2 and an antenna B that outputs a transmission wave W3, a phase difference between the transmission wave W2, which is output from the antenna A, and the transmission wave W3, which is output from the antenna B, is brought to θ2-θ3. In such a case, in the first embodiment, adjusting a phase difference between the transmission wave W2, which is output from the antenna A, and a reference signal R to θ2 and adjusting a phase difference between the transmission wave W3, which is output from the antenna B, and the reference signal R to θ3 enable the phase difference between the transmission wave from the antenna A and the transmission wave from the antenna B to be adjusted to θ2-θ3.

Although, in the above-described configuration, the first control circuit 21 and the second control circuit 22 were configured as separate components, the first embodiment is not limited to such a configuration. In the transmitter of the first embodiment, a portion of the circuits may be shared between the first control circuit 21 and the second control circuit 22.

Second Embodiment

Figure 3:
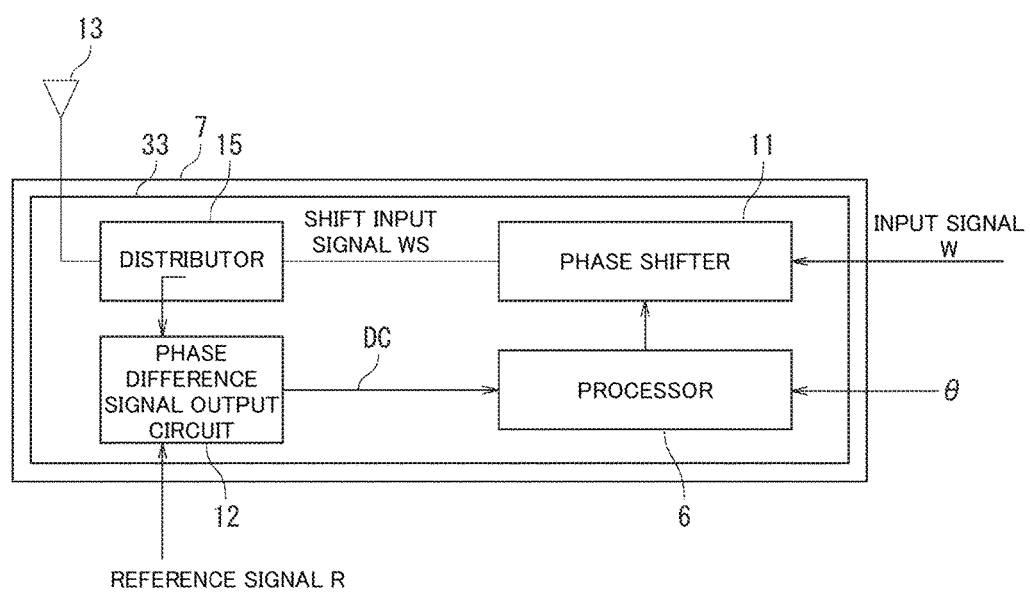
FIG. 3 is a block diagram for a description of a phase adjustment device and a transmitter of a second embodiment of the present invention.

FIG. 3 is a block diagram for a description of a transmitter 7 of the second embodiment. In FIG. 3, the same components as the components illustrated in FIG. 1 are illustrated with the same reference signs assigned thereto. The transmitter 7 of the second embodiment includes a phase adjustment device 33 and an antenna 13. The phase adjustment device 33 differs from the phase adjustment device 3 in that, in place of the extreme value output circuit 14, the target value output circuit 16, the first control circuit 21, and the second control circuit 22 in the phase adjustment device 3, a processor 6 is included. While the extreme value output circuit 14, the target value output circuit 16, the first control circuit 21, and the second control circuit 22 in the first embodiment are hardware configured with circuit elements, the processor 6 is a combination of computer hardware including a CPU and memory and a program running on the computer.

Figure 4:
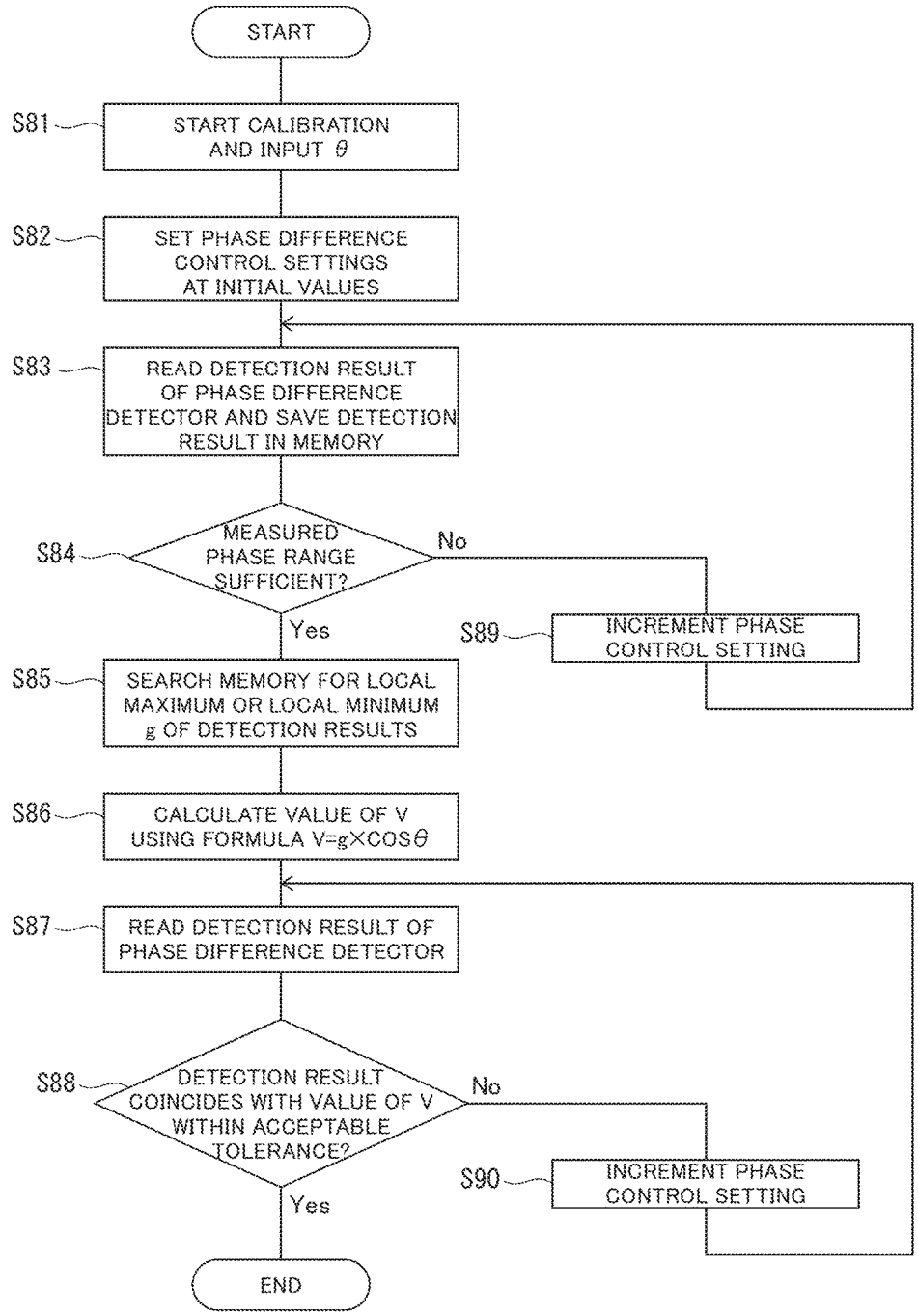
FIG. 4 is a flowchart for a description of processing of phase adjustment performed by a processor illustrated in FIG. 3.

FIG. 4 is a flowchart for a description of phase adjustment processing that is performed by the processor 6, illustrated in FIG. 3. Hereinafter, using FIG. 4, a method in which a program running on the processor 6 adjusts the phase of a transmission wave W from the transmitter 7 will be described.

In step S81, the processor 6 starts phase adjustment (calibration). At this time, to the processor 6, a phase difference θ between a desired phase of the transmission wave W and a reference signal R is input. Next, in step S82, the processor 6 sets, at initial values, conditions in adjusting the phase difference. The items to be set include, for example, an initial value of a control signal that is initially input to the transmitter 7 and an initial phase and a range of phase change and the like that are set to the phase shifter 11 when the processor 6 is to change the phase of the phase shifter 11 by a fixed value.

Next, in step S83, the processor 6 saves a value of a phase difference signal that is output from the phase difference signal output circuit 12 in not-illustrated memory. Next, in step S84, the processor 6 determines whether or not, for all the phases within the range of phase change, which has been set in step S82, values of the phase difference signal have been recorded. When, in step S84, it is determined that values of a phase difference signal DC have not been recorded yet for all the phases within the range of phase change (No in step S84), the processor 6 increments the phase control setting, that is, advances the phase one step, in step S89. Subsequently, in step S83, the processor 6 saves again, in the not-illustrated memory, a phase difference signal that is output with the phase having been changed.

When, in step S84, it is determined that recording of the phase difference signal DC has been completed over the entire range of phase change (Yes in step S84), the processor 6, on the basis of values of the phase difference signal DC saved in the not-illustrated memory, identifies the absolute value g of a local maximum value or a local minimum value (step S85).

Next, in step S86, the processor 6 calculates a value V of g×cosθ based on the identified absolute value g and θ, which has been input in step S81. Subsequently, in step S87, the processor 6 reads a value of the phase difference signal DC that is output from the phase difference signal output circuit 12, and, in step S88, determines whether or not the value of the phase difference signal DC coincides, within an acceptable tolerance, with V, which has been calculated in step S86. When the determination in step S88 results in that the phase difference signal DC does not coincide with V (No in step S88), in step S90, the processor 6 increments the phase control setting by one step. In step S87, the processor 6 reads a value of the phase difference signal DC that is output next from the phase adjustment device 33.

On the other hand, when the determination in step S88 results in that the phase difference signal DC coincides with V (Yes in step S88), the processor 6 finishes phase adjustment of the transmission wave W from the transmitter 7.

In the second embodiment, described above, calibration of the transmitter 7 may be performed using the processor 6. For this reason, making the program, illustrated in FIG. 4, operate on a general-purpose personal computer enables the transmitter 7 to be calibrated without using a dedicated control circuit.

[Receiver]

In both the first embodiment and the second embodiment, described above, an example of application of a phase adjustment device to a transmitter was described. However, the phase adjustment devices in the first embodiment and the second embodiment are not limited to the one configured as a transmitter and may be configured as a receiver.

Figure 5:
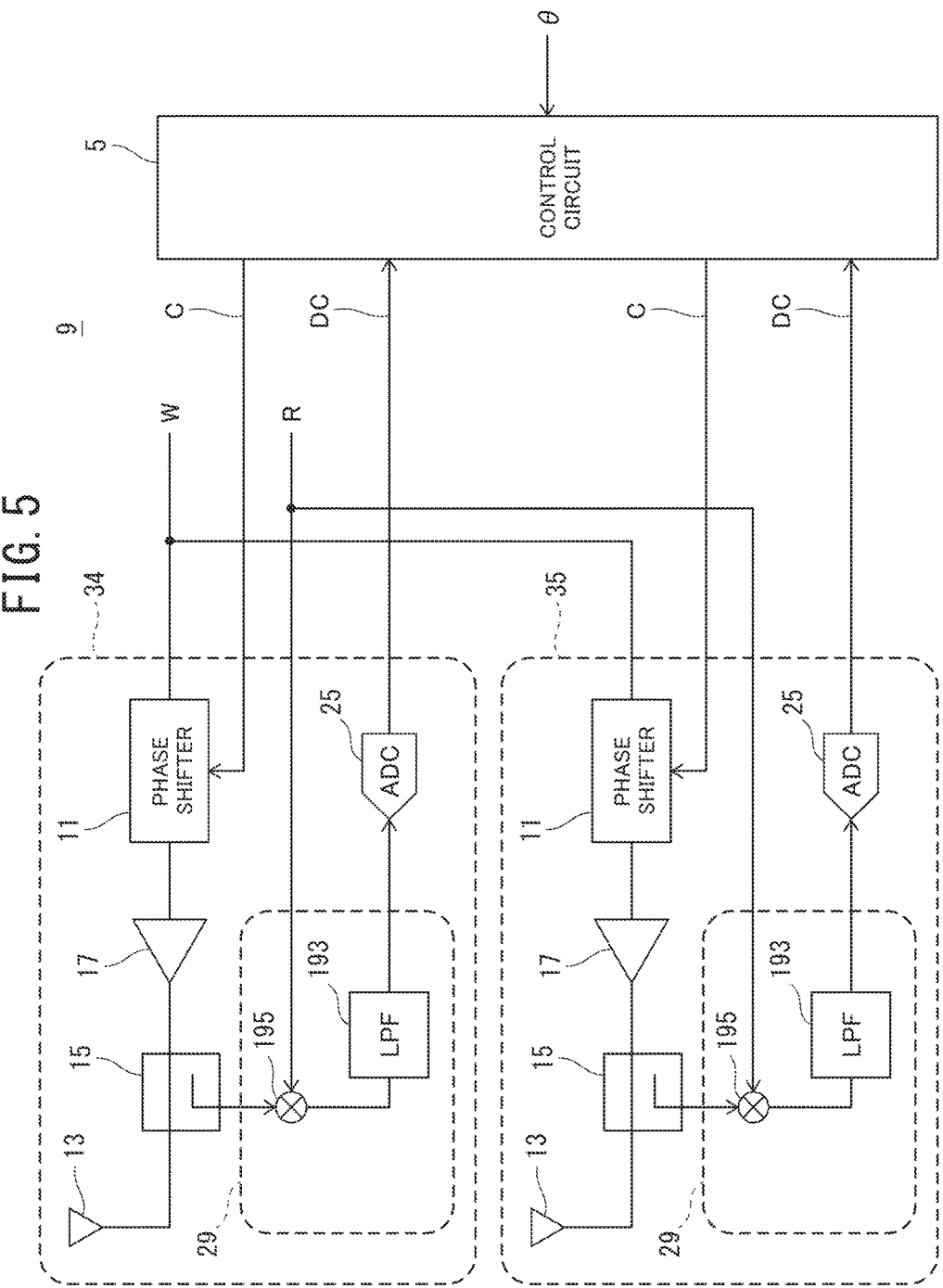
FIG. 5 is a diagram for a description of a receiver to which the phase adjustment device of the first embodiment of the present invention is applied.
Figure 6:
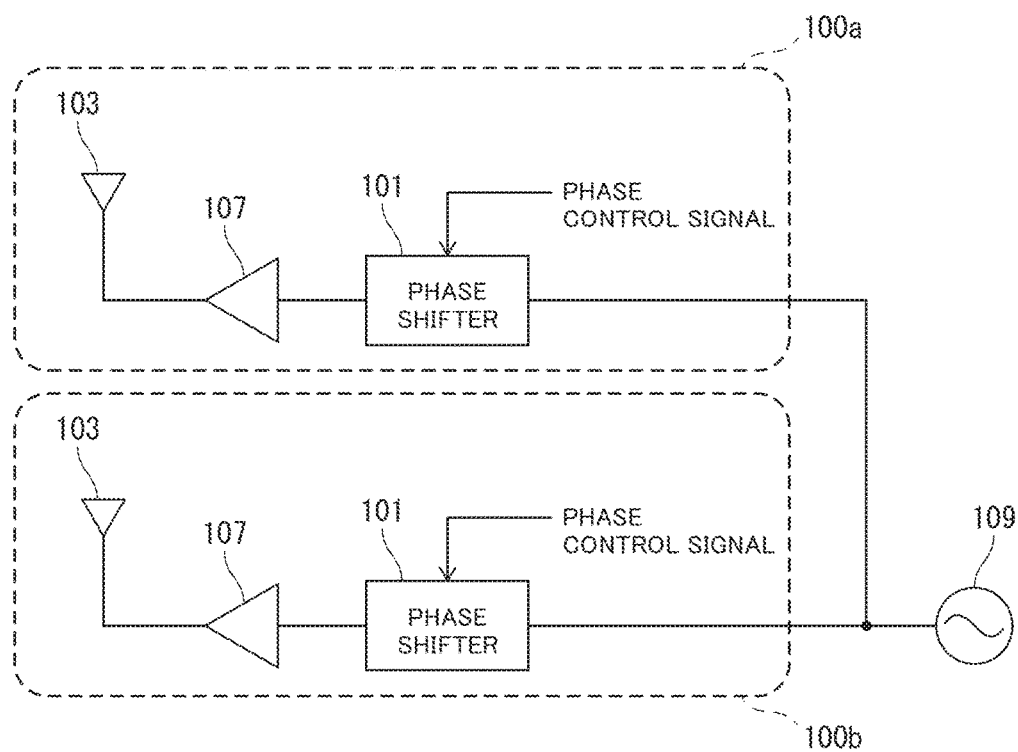
FIG. 6 is a functional block diagram exemplifying a known transmitter.

FIG. 5 is a block diagram illustrative of an example in which the communication device of the first embodiment is configured as a receiver 9. In FIG. 5, the same reference signs are assigned to the same components as the components illustrated in FIG. 1 and a description of some of the components will be omitted.

The receiver 9 includes a reception unit 34, a reception unit 35, and a control circuit 5. Each of the reception units 34 and 35 includes a phase difference signal output circuit 29 that detects a phase difference between a reference signal and a signal to be detected and generates a phase difference signal corresponding to the detected phase difference. Each phase difference signal output circuit 29 includes a down conversion mixer 195 and a low pass filter (indicated by "LPF" in the drawing) 193.

Each of the reception units 34 and 35 also includes a phase shifter 11 that shifts the phase of the signal to be detected. The control circuit 5 determines phase shift amounts of the phase shifters 11 corresponding to the phase difference signals, which are generated by the phase difference signal output circuits 29. It is assumed that, in the receiver 9, the control circuit 5 performs functions of the extreme value output circuit 14, the target value output circuit 16, the first control circuit 21, and the second control circuit 22 that are illustrated in FIG. 1.

In the receiver 9, the signal to be detected is an input signal W that is received by antennas 13, and a signal that is to be input to the phase difference signal output circuits 29 is a reference signal R.

Each of the reception units 34 and 35 also includes a distributor 15 between the phase shifter 11 and the antenna 13. Each of the reception units 34 and 35 includes an analog-digital converter (indicated by "ADC" in the drawing) 25 between the phase difference signal output circuit 29 and the control circuit 5. A signal output from the phase difference signal output circuit 29 is A/D converted to a DC signal.

The phase shifters 11 are disposed in local transmission paths in the reception units 34 and 35. The input signals W distributed to the respective channels are transmitted to the phase shifters 11 and the distributors 15. The input signal W distributed by each distributor 15 is input to the down conversion mixer 195 in the corresponding phase difference signal output circuit 29 in conjunction with the reference signal R.

Each of the down conversion mixers 195 outputs a signal corresponding to a phase difference between the input signal W and the reference signal R to the corresponding low pass filter 193. The low pass filter 193 outputs a phase difference signal corresponding to the phase difference between the input signal W and the reference signal R to the ADC 25 connected thereto, and the ADC 25 converts the phase difference signal into a digital signal and outputs the converted digital signal to the control circuit 5 as a phase difference signal DC.

The control circuit 5 processes information in accordance with a predetermined known procedure and outputs necessary control signals C to the phase shifters 11 in the reception units 34 and 35.

As described above, the phase adjustment device of the first embodiment may be configured as both the transmitter 1, illustrated in FIG. 1, and the receiver 9, illustrated in FIG. 5. Applying the phase adjustment device of the first embodiment to the receiver 9 also enables the phases of local signals that a plurality of receivers 9 receive to coincide with one another.

INDUSTRIAL APPLICABILITY

The present invention described above is suitable for a communication field in which a high frequency signal in the order of several tens of GHz is used as a transmission wave or a reception wave and the phase thereof is required to be controlled with high accuracy.

REFERENCE SIGNS LIST 1, 7 Transmitter
3, 33 Phase adjustment device
5 Control circuit
6 Processor
9 Receiver
11 Phase shifter
12 Phase difference signal output circuit
13 Antenna
14 Extreme value output circuit
15 Distributor
16 Target value output circuit
21 First control circuit
22 Second control circuit
25 ADC
29 Phase difference signal output circuit
34, 35 Reception unit
193 Low pass filter
195 Down conversion mixer

The invention claimed is:

1. A transmitter comprising:
a phase shifter configured to shift a phase of an input signal and to output a shifted signal the phase of which is shifted;
a first control circuit configured to change, within a predetermined range, a phase shift amount by which the phase shifter shifts the phase of the input signal;
a phase difference signal output circuit configured to receive the shifted signal output by the phase shifter and a reference signal and to output a phase difference signal based on a phase difference between the shifted signal and the reference signal;
an extreme value output circuit configured to, when the phase difference signal takes an extreme value while the first control circuit is changing the phase shift amount, output a value of the phase difference signal at the phase shift amount at which the phase difference signal becomes the extreme value;
a target value output circuit configured to, based on an output from the extreme value output circuit, output a target value; and
a second control circuit configured to control the phase shift amount of the phase shifter in such a way that a value of the phase difference signal output by the phase difference signal output circuit coincides with the target value output from the target value output circuit,
wherein the phase shifter shifts the phase of the input signal in accordance with the phase shift amount controlled by the second control circuit and outputs the input signal the phase of which is shifted as a transmission wave.

2. The transmitter according to claim 1, wherein
the second control circuit receives the phase difference signal from the phase difference signal output circuit and the target value from the target value output circuit, and controls the phase shift amount of the phase shifter so that the phase difference signal coincides with the target value.

3. A transmission method comprising:
a first phase shift step of shifting a phase of an input signal within a predetermined range of phases;
a phase difference signal generation step of generating a phase difference signal based on a phase difference between the input signal the phase of which is shifted in the first phase shift step and a reference signal;
an extreme value output step of, when the phase difference signal takes an extreme value while the phase of the input signal is being shifted in the first phase shift step, outputting a value of the phase difference signal at a phase shift amount at which the phase difference signal becomes the extreme value;
a target value output step of outputting a target value based on the value of the phase difference signal output in the extreme value output step;
a second phase shift step of shifting the phase of the input signal in such a way that a value of the phase difference signal generated in the phase difference signal generation step coincides with the target value; and
outputting, as a transmission wave, the input signal the phase of which is shifted in the second phase shift step.

4. A phase adjustment device comprising:
a phase shifter configured to shift a phase of an input signal and to output a shifted signal the phase of which is shifted;
a first control circuit configured to change, within a predetermined range, a phase shift amount by which the phase shifter shifts the phase of the input signal;
a phase difference signal output circuit configured to receive the shifted signal output by the phase shifter and a reference signal and to output a phase difference signal based on a phase difference between the shifted signal and the reference signal;

an extreme value output circuit configured to, when the phase difference signal takes an extreme value while the first control circuit is changing the phase shift amount, output the extreme value of the phase difference signal;

a target value output circuit configured to output a target value that is set based on the extreme value output by the extreme value output circuit; and a second control circuit configured to control the phase shift amount of the phase shifter in such a way that a value of the phase difference signal output by the phase difference signal output circuit coincides with the target value output from the target value output circuit.

5. The phase adjustment device according to claim 4, wherein the second control circuit receives the phase difference signal from the phase difference signal output circuit and the target value from the target value output circuit, and controls the phase shift amount of the phase shifter in such a way that the phase difference signal coincides with the target value.

6. A phase adjustment method comprising:

a first phase shift step of shifting a phase of an input signal within a predetermined range of phases;

a phase difference signal generation step of generating a phase difference signal based on a phase difference between the input signal the phase of which is shifted in the first phase shift step and a reference signal;

an extreme value output step of, when the phase difference signal takes an extreme value while the phase of the input signal is being shifted in the first phase shift step, outputting a value of the phase difference signal at a phase shift amount at which the phase difference signal becomes the extreme value;

a target value output step of outputting a target value based on the value of the phase difference signal output in the extreme value output step; and a second phase shift step of shifting the phase of the input signal in such a way that a value of the phase difference signal generated in the phase difference signal generation step coincides with the target value.

* * * * *